Dec. 30, 1947. C. E. BENNETT ET AL 2,433,505
MEANS FOR LOCATING ELECTRICAL FAULTS IN ELECTRIC CABLE SYSTEMS
Filed Sept. 21, 1944
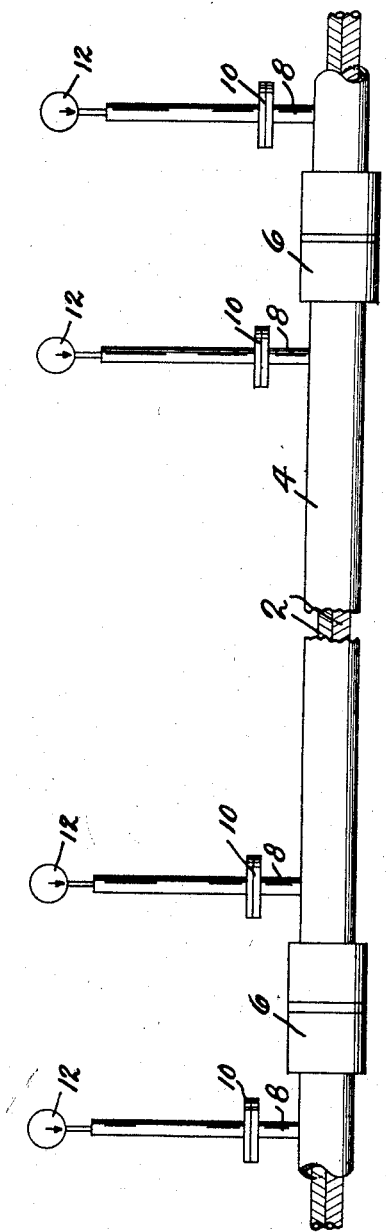
Charles E. Bennett.
Guy N. Everest.
INVENTORS.
BY James G. Bulkeley
Attorney.

UNITED STATES PATENT OFFICE 2,433,505

MEANS FOR LOCATING ELECTRICAL FAULTS IN ELECTRIC CABLE SYSTEMS

Charles E. Bennett and Guy N. Everest, Ridgewood, N. J., assignors to The Okonite-Callender Cable Company, Incorporated, Paterson, N. J., a corporation of New Jersey Application September 21, 1944, Serial No. 555,054

2 Claims. (Cl. 174—11)

Our invention relates to means for locating electrical faults in electric cable systems.

One of the objects of our invention is to provide apparatus in connection with electric cable systems by which electric faults in the system readily may be detected and located, whether the system is buried in the ground or installed above the ground.

More specifically our invention is directed to improved means for detecting and locating faults in electric cable systems of the type wherein the cable conductors are surrounded by relatively large bodies of fluid insulation. For example, in one well known electric cable system one or more insulated cable conductors are loosely enclosed in a pipe line which is kept filled with oil under superatmospheric pressure, say of the order of 200 pounds per square inch. We have discovered that when an electric fault occurs in one or more of the conductors of a fluid filled system, a very high pressure is instantaneously built up in the insulating fluid in the immediate vicinity of the fault, creating a pressure impulse which may be measured some distance from the fault.

As is usual in electric cable systems, joints are provided at intervals along the line, which to some extent sectionalize the line, so that the pressure impulse created by a short circuit or other electric fault between any pair of adjacent joints is very pronounced in that section of the system.

Accordingly we provide our apparatus along the length of the system between the joints. This apparatus is of such character as to be actuated or influenced by the pressure impulse produced by an electric fault, and is so located that it may be inspected readily, and not only is it possible to detect a fault but it is possible readily to locate the section of the line in which it has occurred.

In the accompanying drawing we have illustrated in elevation a short length of an electric cable system embodying our invention.

Referring to the drawing in detail: 2 designates the insulated conductors of an electric cable system. These conductors are drawn into a steel pipe line 4 which is kept filled with an insulating fluid, cable insulating oil, for example, maintained under superatmospheric pressure of the order of 200 pounds per square inch.

As is usual the system is jointed at intervals by joints 6 which in effect divide the system into sections or relatively short lengths.

Between adjacent joints, preferably in each cable section, we install one or more of our devices which, as above noted, are of such character as to be actuated or influenced by the pressure impulse produced by a short circuit or other electric fault.

These devices may take various forms. For purposes of illustration and description we have shown short tubes 8 set into the pipe line at desired intervals. We have shown a plurality of these tubes installed between the one pair of joints. As many may be installed as may be found necessary or desirable. If the distance between joints is very short, one may even suffice.

Each tube, which of course communicates with the interior of the pipe line 4, as will be understood, is equipped with a device capable of withstanding the normal pressure in the insulating fluid of the cable. A suitable device for this purpose is a diaphragm, which has been illustrated at 10. Each diaphragm, while capable of withstanding the normal pressure in the insulating fluid of the system, will be operated by the pressure impulse produced by an electric fault in the system, in the cable section in which the diaphragm is located. For example, the diaphragm simply may be deflected or it may be ruptured.

Located at the upper end of each tube 8, we have shown an indicating device in the form of a gauge 12. Each gauge normally stands at no pressure, but after a diaphragm 10 has been operated, the corresponding gauge will indicate pressure.

Preferably these gauges are of the maximum indicator type, for while the pressure impulse is only momentary, the gauge will remain set at whatever pressure was developed. This type of gauge has a further advantage, in that for some reason or other the normal pressure on the system may have dropped to atmospheric pressure, in which event, however, the gauge would remain standing at whatever pressure was built up due to the pressure impulse produced by an electric fault.

However, an ordinary pressure gauge may be suitable where conditions are such that there is always some pressure on the system. Such a gauge would normally show no pressure, but where a diaphragm is ruptured then the cable fluid, which it is being assumed is under some pressure, would be accessible to the gauge and the latter would register accordingly.

It is to be understood, of course, that each tube 8, between the diaphragm and the upper end of the tube, is so dimensioned that some of the pressure impulse is dissipated or absorbed before reaching the gauge. This will prevent injury to the gauges. This precaution is necessary only where the diaphragms 10 are to be ruptured by the pressure impulse.

It is to be understood that the gauges 12 may be located where they are visible at all times, or they may be beneath the ground, but readily accessible. The desideratum is that the gauges may be read without the necessity of digging up a section of the system.

It is to be understood further that the gauges 12 may be substituted by other devices within the purview of our invention. For example, the gauges 12 may be dispensed with entirely and a glass or other transparent peep be installed in the tubes 8 above the diaphragms. In the event of a diaphragm being ruptured due to an electric fault, the insulating fluid will fill the pipe above the diaphragm and if this fluid is oil may readily be seen through the peep. On the other hand, a simple petcock may be installed at the upper end of the tubes 8, and when this is opened and insulating fluid flows out, it is evident that the diaphragm for that petcock has been ruptured.

What we claim is:

1. In combination with an electric cable system sectionalized into sections or short lengths by joints at intervals along the system and embodying an insulated conductor, liquid insulation under a pressure of the order of 200 pounds per square inch surrounding the same and a pipe line for the conductor and liquid, the pipe line being filled with the liquid and sealed against the entry of air or other gas, of means for determining the location of an electrical fault in any section of the system, said fault locating means comprising a plurality of tubes in each section of the system each communicating with the interior of the pipe line, a diaphragm across each tube, the diaphragms nearest the fault to be located being rupturable by a pressure impulse produced in the liquid insulation by the fault, and means for indicating the ruptured diaphragms, said indicating means being operative by the said pressure impulse even though the pressure in the pipe line had dropped to atmospheric prior to rupture of the diaphragms.

2. In combination with an electric cable system sectionalized into sections or short lengths by joints at intervals and embodying an insulated conductor, liquid insulating under high superatmospheric pressure surrounding the same, and a pipe line for the conductor and liquid insulation, the pipe line being filled with the liquid insulation and sealed against the entry of air or other gas, of means for locating an electric fault in the system, said means comprising a plurality of pressure indicators in each section of the system, said indicators normally being out of communication with the interior of the pipe line, and means cooperating with each pressure indicator and operated by a pressure impulse produced in the liquid of the system by an electrical fault for initiating the operation of the indicators nearest the fault, said last mentioned means being operative independently of the pressure in the pipe line immediately prior to the occurrence of the electrical fault.

CHARLES E. BENNETT.
GUY N. EVEREST.

REFERENCES CITED

The following references are of record in the file of this patent:

UNITED STATES PATENTS

| Number | Name | Date |
|---|---|---|
| 1,549,665 | Hill et al. | Aug. 11, 1925 |
| 1,774,946 | Rankin | Sept. 2, 1930 |
| 1,853,882 | Roper | Apr. 12, 1932 |
| 1,917,129 | Kirch | July 4, 1933 |
| 1,918,036 | Hilliard | July 11, 1933 |
| 1,964,684 | Clark | June 26, 1934 |
| 2,004,769 | Shanklin | June 11, 1935 |
| 2,263,840 | Franck | Nov. 25, 1941 |
| 2,326,557 | Peirce | Aug. 10, 1943 |